Jan. 12, 1971  E. SHANBROM ET AL  3,554,702
APPARATUS FOR VIEWING PARTICLE PRODUCING REACTIONS
Filed May 17, 1968  3 Sheets-Sheet 1
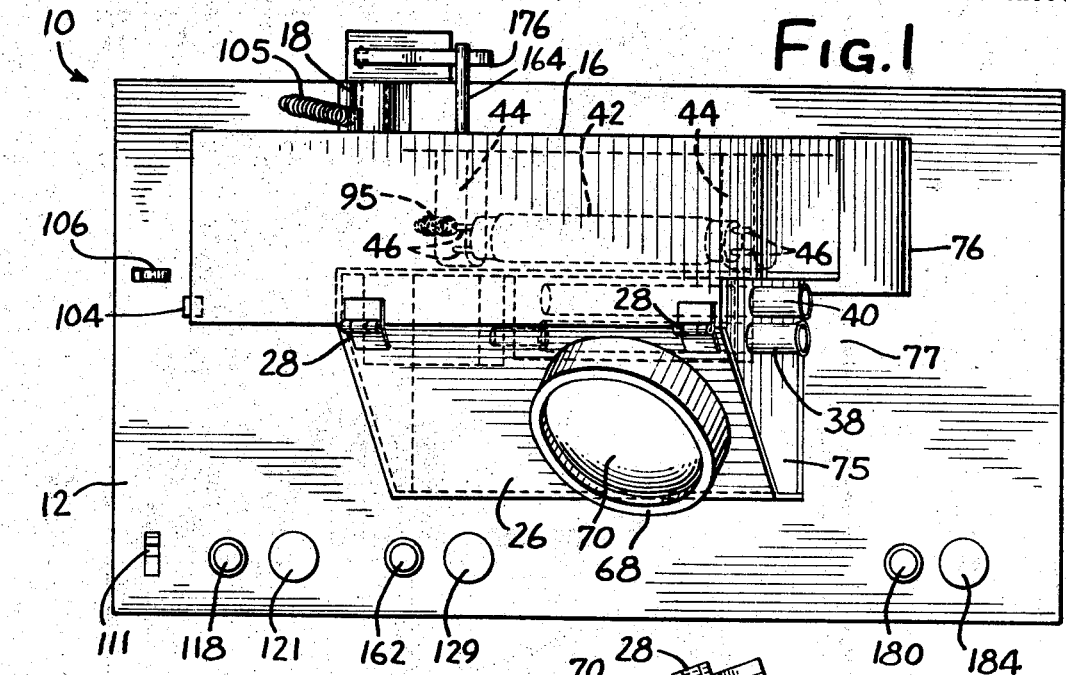
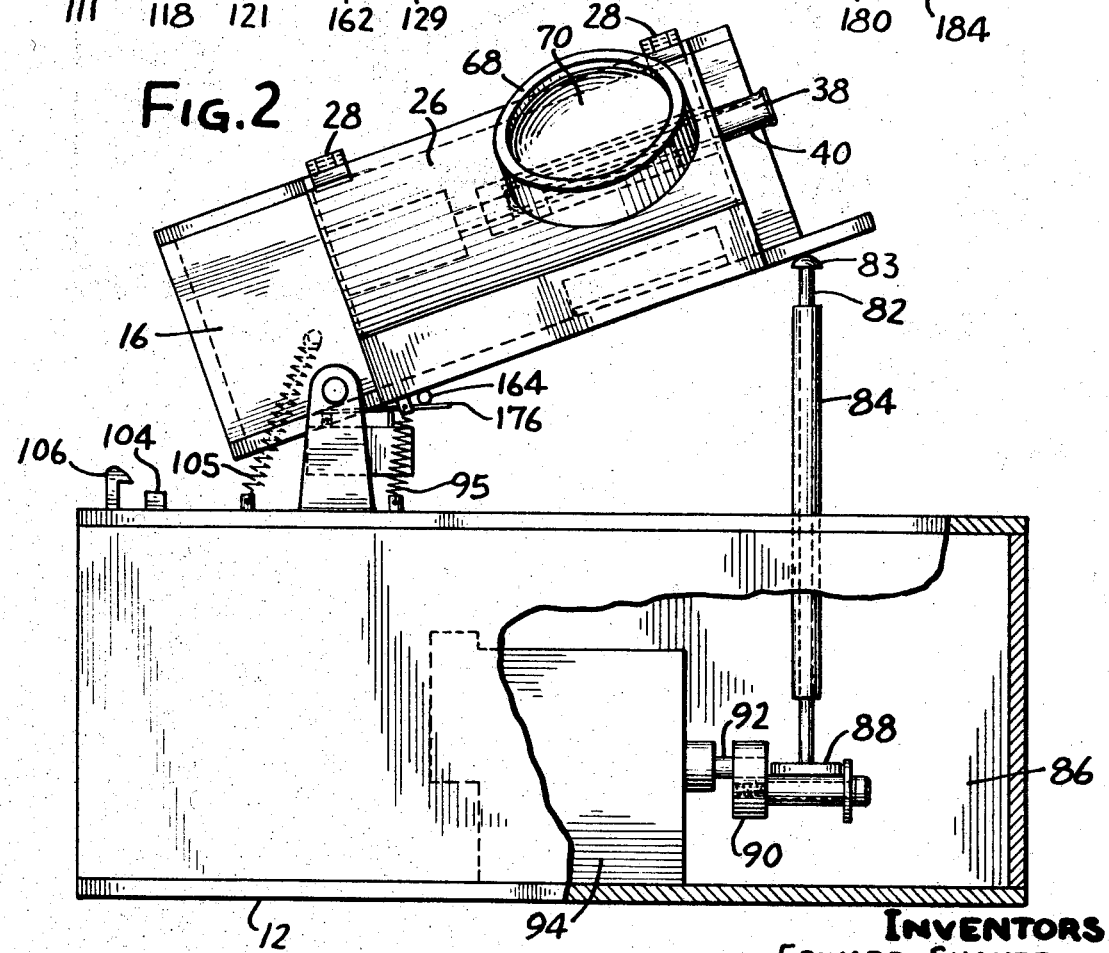
INVENTORS
EDWARD SHANBROM
EDWARD P. KAMIENSKI, JR.
by: Richard J. Reilly
ATTY.

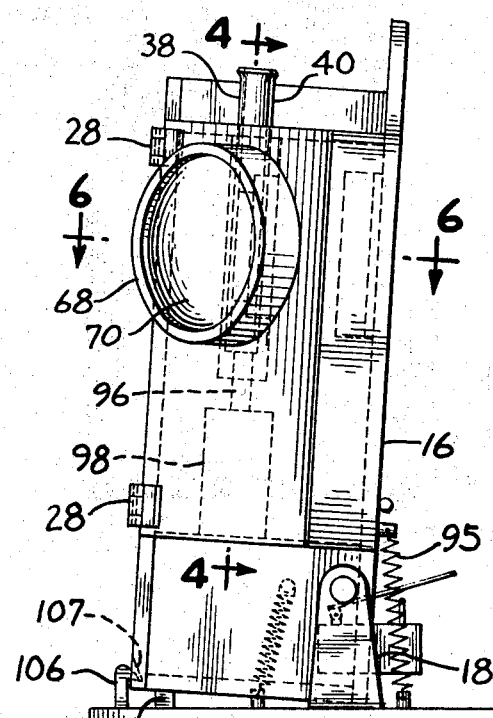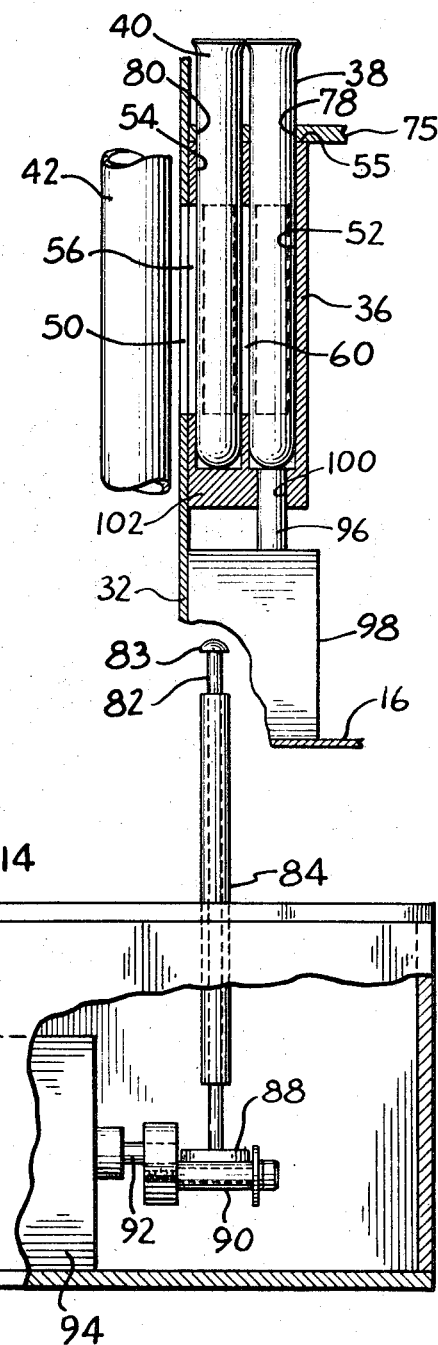

Jan. 12, 1971  E. SHANBROM ET AL  3,554,702
APPARATUS FOR VIEWING PARTICLE PRODUCING REACTIONS
Filed May 17, 1968  3 Sheets-Sheet 3
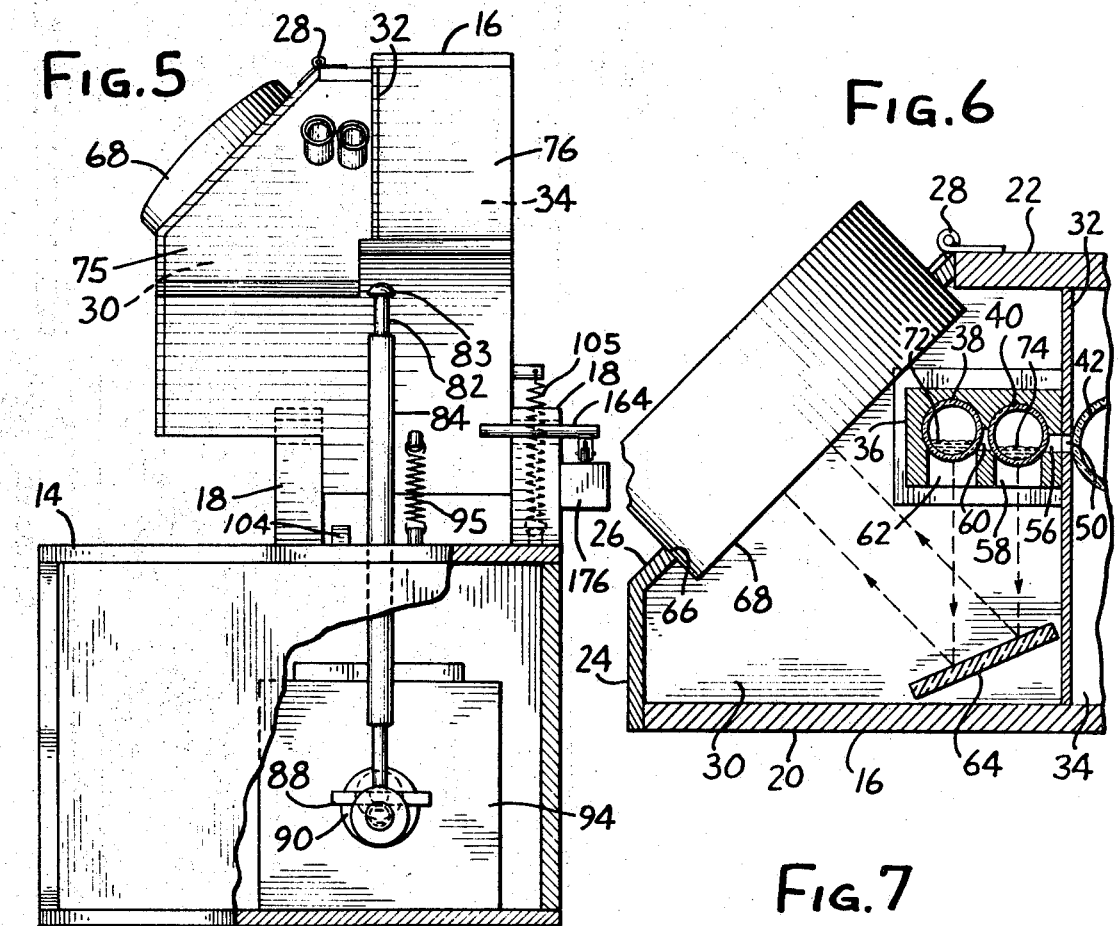
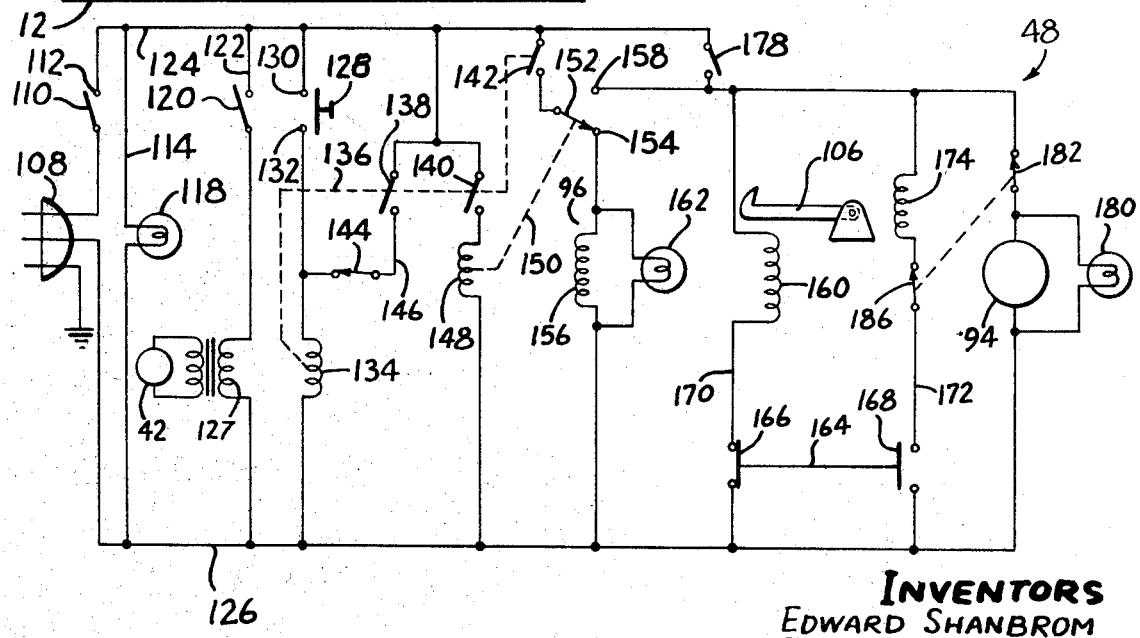
INVENTORS
EDWARD SHANBROM
EDWARD P. KAMIENSKI, JR.
by: Richard J. Reilly
ATTY.

United States Patent Office 3,554,702
Patented Jan. 12, 1971

3,554,702
APPARATUS FOR VIEWING PARTICLE PRODUCING REACTIONS
Edward Shanbrom, Santa Ana, Calif., and Edward P. Kamienski, Jr., Upper Saddle River, N.J., assignors to Baxter Laboratories, Inc., Morton Grove, Ill., a corporation of Delaware
Filed May 17, 1968, Ser. No. 730,161
Int. Cl. G01n 31/02, 33/16
U.S. Cl. 23—253       15 Claims

ABSTRACT OF THE DISCLOSURE

A holder is movable in a first position at a predetermined rate for indirectly displaying particles produced in a time controlled reaction in a holder supported receptacle and under light passing through a path defined by the holder. The holder is held in a second position during a reaction period and therafter spontaneously assumes the first position.

---

The present invention relates to a viewing apparatus. Particularly the invention relates to an apparatus for forming particles and for viewing particles formed in a chemical reaction in a liquid. Specifically the invention relates to a combination chemical reactor and particle viewer adapted as a diagnostic tool for a disease state.

Well-known immune and serologic reactions conventionally have been used in diagnosing disease states because of generation of therewith associated distinctive particles. In many such reactions normal particles may be generated which are not associated with a disease state. However, these normal particles may be misinterpreted by a technician as being disease state associated.

Errors in discrimination arising from past practices can be linked to (1) normal variations in the techniques for producing the reactions and (2) normal variations of conditions under which the particles produced in reaction were viewed. The extent of possible and significant variations is appreciated when it is considered that according to past practice for producing one particle forming immunologic reaction, standard quantities of a pair of reagents are added to a test tube. The tube is manually shaken by a technician for a "short" interval of time (not otherwise standardized) to produce particles. The latter are viewed by a technician under any available light, and he makes a mental comparison between a recollected disease associated particles and the condition he sees while manually shaking the tube to enable an improved view of the particles. From the foregoing it is observed that: (1) the reaction period to an extent is discretionary; (2) the lighting from place to place of evaluation may not be uniform; (3) other conditioning of particles while being viewed may not be uniform, and (4) there may not be an objective standard for comparison.

It is an object of the present invention to provide improved apparatus for viewing particles in a liquid.

It is another object of the invention to provide an improved diagnostic tool for a disease state.

It is an additional object of the invention to facilitate diagnosis of a disease state.

It is a further object of the invention to enable ready comparison of a reaction used as a standard with a test result in which particles have been formed in a liquid.

It is a still further object of the invention to provide uniform conditions for effecting and viewing the result of a particle forming reaction.

Moreover it is an object of the invention to minimize manual involvement in a laboratory technique for effecting a particle forming chemical reaction and viewing its result.

The foregoing objects are achieved by viewing apparatus which comprises a holder for a transparent open ended receptacle containing a liquid and therewith mixed particles. Means are arranged in the apparatus for illuminating the contents of a receptacle in the holder. Means are provided for supporting the holder in a first position. Means for moving said holder while supported in said first position and at a predetermined rate are adapted correspondingly to stir particles in a liquid in a receptacle in the holder. Means supported in light transmission alignment with said holder enable indirect viewing of the condition of receptacle contents while illuminated and stirring in said holder.

How to further effect the foregoing and other objects, features and advantages of the invention will become more apparent upon consideration of the following description and appended claims, when considered in conjunction with the accompanying drawings wherein the same reference character or numeral refers to like or corresponding parts throughout the several views.

On the drawings:

FIG. 1 is a top plan view of apparatus embodying the present invention.

FIG. 2 is a front elevational view of said apparatus having a holder disposed in the same angular condition as in FIG. 1, parts being broken away for the purpose of illustration.

FIG. 3 is a view similar to FIG. 2, the holder, however, being disposed in another angular position.

FIG. 4 is an enlarged detail view according to the line 4—4 of FIG. 3.

FIG. 5 is an elevational view looking from the right of FIG. 1 toward the right end of said apparatus, parts being broken away for the purpose of illustration.

FIG. 6 is an enlarged detail view according to the line 6—6 of FIG. 3.

FIG. 7 is a scheme of an electrical circuit adapted for operating said apparatus.

Referring now more particularly to the drawings, viewing apparatus generally designated 10 comprises a base casing 12 having an upper horizontal supporting surface 14. A housing 16 and consequently a holder 36 therein are rockably supported from one end portion of housing 16 and above casing 12 by a trunnion 18 which projects upwardly from the surface 14. In the present embodiment housing 16 has a floor 20 (FIG. 6) and a thereto parallel top wall 22. A cover 24 with an angularly disposed section 26 is pivotally connected to top wall 22 by means of a pair of hinges 28 for enabling access to a front chamber 30 defined within housing 16. A partition 32 within the housing separates said front chamber from a rear chamber 34 (FIG. 5).

Light source means, for illuminating transparent receptacles 38 and 40 while in holder 36, in the illustrated embodiment, comprises an elongated conventional fluorescent tube 42 with opposed terminal fittings 46 (FIG. 1). The latter are releasably retained in terminal sockets (not shown) carried in a pair of opposed arms 44 (FIG. 1) for supporting said light tube in a fixed position in chamber 34 for excitation thereof through an electrical circuit generally designated 48 (FIG. 7). Light tube 42 is disposed adjacent partition 32 for projecting light toward chamber 30 through an elongated slot 50 (FIG. 6) formed in partition 32.

Holder 36 which comprises a block of rectangular profile is disposed in chamber 30 medially of top wall 22 and floor 20 and is rigidly secured to or hung from a medial portion of partition 32 by any suitable means. Holder 36 has first and second parallel and adjoining fells 52 and 54 (FIG. 4) which are shown as elongated longitudinally of said holder and opening at one end face 55 of said holder. The wells are proportioned for removably receiving, respectively, receptacles 38 and 40 which herein are fashioned as test tubes. In the present embodiment well 54 is disposed closer to partition 32 than is well 52.

Holder 36 has a first pair of slots 56 and 58 (FIG. 6) which are disposed normally to each other and define a first light path. To that end slot 56 extends longitudinally of tube 42 and is disposed in registration with slot 50. The holder has a second pair of slots 60 and 62 which define a second light path and are disposed normally to each other. The last slots extend from well 52 in a manner such that slot 60 is disposed between wells 52 and 54 and is in alignment with slot 50, and slot 62 is parallel to slot 58. In consequence of the foregoing the holder is arranged in said housing for support of receptacles 38 and 40 in light transmission alignment with the light tube 42.

A mirror 64 comprising means for indirectly viewing the contents of receptacles 38 and 40 is arranged in chamber 30 to reflect light according to directional arrows (FIG. 6) from the light paths in the holder through a window 66 fashioned in cover 26. A viewer 68 comprising an assembly preferably with a magnifying lens 70 (FIGS. 1 and 2), is secured in window 66 by any suitable means whereby the condition of contents of the receptacles may be seen from outside housing 16. In the present embodiment receptacle 40 is adapted for holding a liquid 74 with particles therein representing a standard with which the condition of liquid 72 in tube 38 can be visually compared under light from light tube 42 passing in the manner aforesaid.

Face 55 of holder 36 abuts an inwardly offset end section 76 (FIGS. 1 and 4) of housing 16. Section 76 has a pair of apertures 78 and 80 which are aligned in registration with the receptacle receiving openings of wells 52 and 54, respectively. They accommodate projection of the open end portions of receptacles 38 and 40 into a cove 77 outside of chamber 30. Thereby access to said receptacles when in said holder can be had when cover 26 is closed.

Trunnion 18 provides means for enabling manual movement or partial rotation of housing 16 and accordingly holder 36 from a first position to a second position in the latter of which receptacles 38 and 40 are rather erect with their end openings upwardly directed, as in FIG. 3. In the first position, shown in FIGS. 1 and 2, the housing and holder are supported on means comprising the upper bearing end portion 83 of a vertically reciprocative arm 82 (FIGS. 2, 3 and 5) and in a manner such that receptacle end openings are directed essentially to one side. While the housing and holder are in said first position they are rockably movable or alternateable between first and second angular aspects at a predetermined rate.

In the first aspect, housing 16 is preferably disposed in a manner such that the longitudinal axes of receptacles 38 and 40 are as close (an angle of about 20°) to the horizontal as possible without spilling receptacle contents. In the second aspect, the angle to the horizontal is slightly larger, sufficient so that when the housing and holder are rocked in a manner to be hereinafter described a sloshing motion will be imparted to the liquid in the receptacles to the end that particles therein are gently stirred.

Means for effecting such rockable movement or alternation of holder 36 comprises arm 82 which is shown as journaled in a sleeve 84 which extends through plate 14 into chamber 86 of the casing 12. At its lower end portion arm 82 carries a follower plate 88 which is operably engaged with crank 90 driven from shaft 92 of power means comprising a motor 94 which is disposed in chamber 86. In consequence of the foregoing arrangement, when the motor 94 is operating, arm 82 will be vertically reciprocated for alternating holder 36 about the axis defined by trunnion 18. A tension spring 95 which is shown secured from one end portion to housing 16 and from its other end portion to surface 14 buffers the alternations of holder 36.

Agitating means comprising a rod 96 extending axially of receptacle 38 is caused to vibrate rapidly longitudinally by a solenoid 98 (FIGS. 3 and 4) which is mounted in an end portion of chamber 30. Said rod projects through an aperture 100 in one end portion 102 of holder 36 and is proportioned for vibratingly engaging the bottom of receptacle 38 to agitate the liquid contents and stimulate a particle forming reaction.

Movement of housing 16 from said first position beyond said second position is limited by an abutment or stop 104 (FIGS. 2 and 3) projecting upwardly from surface 14 (FIG. 1). The stop is proportioned so that the center of gravity of housing 16 and contents when in said second position is to the right of the rotational axis defined by trunnion 18 when viewed in FIG. 3. This arrangement insures biasing of said housing, light tube 42 and holder 36 toward said first position against control or buffer effect of an expansion spring 105 which at its opposite ends is connected to housing 16 and casing 12. The invention is not limited, however, to the illustrated biasing means, the intent being that housing 16 and therewith associated parts fall spontaneously to the first position when released from said second position.

A latch 106 which comprises means for releasably securing housing 16 and therein contained parts in said second position projects upwardly through plate 14. The latch is spring biased for snapping engagement with a catch 107 (FIG. 3) carried from an end portion of housing 16. Latch 106 is adapted for releasing its hold on housing 16 in said second position by means to become apparent from ensuing description whereupon said housing and therein contained parts will fall spontaneously to said first position.

A manner in which the apparatus effectively can be employed may be appreciated by reference to FIG. 7. There it is seen that circuit 48 comprises a pair of connected together conductive assemblies 124 and 126 which are connectable to a power source through a conventional electrical plug 108 upon closure against terminal 112 of a push-to-make, push-to-break single pull, single throw switch 110 having a manual control member 111 (FIG. 1). In consequence thereof a closed circuit will be established across portions of circuit assemblies 124 and 126 through a conductor 114 for illuminating a therein series coupled indicator light 118. To illuminate light tube 42, and energize the transformer 127 to which said light tube is coupled, a push-to-make, push-to-break single pole, single throw switch 120 having a manual control member 121 (FIG. 1) may be series connected to said transformer and interposed in a conductor 122 which is arranged parallel to conductor 114 across portions of circuit assemblies 124 and 126.

When it is desired to begin agitation of receptacle 38 through arm 96, a switch 128, which is normally biased to an open condition, and having a manual control member 129, will be closed against a pair of terminals 130 and 132. This preferably will be done when the casing is in its second position and then upon commencement, during or after addition to said receptacle of a reagent for reaction with another agent then in said receptacle. Momentary closing of switch 128 is adapted to energize the inductance coil 134 of a stacked relay 136. The latter comprises a plurality of normally open single pole, single throw relay switches 138, 140 and 142 which are arranged for magnetic coupling to coil 134 and consequent closure thereby. Switch 138 once closed magnetically continuously will hold said coil in an energized state regardless of the condition of switch 128 thereafter. Such effect results from completion of a circuit across circuit assemblies 124 and 126 through a conductive path 146 which includes a normally closed switch 144 and switch 138.

Closure of the switch 140 is adapted to close a circuit across circuit assemblies 124 and 126 through an inductance coil 148 of a time delay relay 150, the switch 152 of which is maintained in a normally closed condition against a terminal 154. Switch 142 is adapted, when closed, to complete a circuit between circuit assemblies 124 and 126 through a solenoid 156 which controls vibrations of arm 96. A lamp 162 supported in casing 12 is connected across the terminals of solenoid 156 for indicating the condition of arm 96.

Vibration of said last arm, once begun, normally will continue for a period determined by the time delay relay 150 at which time switch 152 will become magnetically coupled to coil 148 for movement away from terminal 154 and into contact with a terminal 158. Thereupon the circuit of solenoid 156 will open and a circuit will close across circuit assemblies 124 and 126 through a solenoid 160. The latter is arranged for magnetically controlling a dog 106 for releasing housing 16 and accordingly comprises means for releasing holder 36 in response to passage of time. Simultaneously, agitation of the contents of receptacle 38 will stop and housing 36 under its normal biasing and the tension of spring 95 will fall from its second position (in a clockwise direction with respect to FIG. 3) into bearing engagement with vertically reciprocative arm 82.

Circuits through a pair of parallel circuit wires 170 and 172 across circuit assemblies 124 and 126 are arranged to be opened and closed by flat mechanically connected contact plates 166 and 168 of a microswitch 164 which is mounted adjacent housing 16. The arrangement is such that for each condition of one of said last circuit wires, the other is in an opposite condition. Solenoid 160 is connected in series in circuit wire 170 and the inductance coil of a relay 174 is connected in circuit wire 172.

Microswitch 164 is biased in a manner such that contact plates 166 and 168, respectively, normally close the circuit in wire 170 and simultaneously open the circuit through wire 172. Said microswitch has a sensing element 176 (FIGS. 2, 3 and 5) which is arranged in the path of falling housing 16 for moving plate 168 to a circuit closed position and moving plate 166 to an open position. Accordingly, as housing 16 falls, solenoid 160 will become deenergized and latch 106 will be restored to its normal position, prepared for snapping into retaining engagement with housing 16 when it is returned again to its second position. Simultaneously, coil 174 can become energized by reason of a closed circuit through then closed position plate 168 and switch 152 through terminal 158.

A switch stack comprising normally closed switch 144 and a normally open bypass switch 178 which are arranged for magnetic coupling with coil 174, respectively, open and close when said last coil becomes energized.

The opposite terminals of motor 94 are connected to circuit assemblies 124 and 126, respectively, in a manner such that upon closure of switch 154 to terminal 158, the motor is in a closed circuit for reciprocating arm 82. A lamp 180 which is mounted in casing 12 and connected across the terminals of motor 94, will light upon energization of the motor to indicate the condition thereof.

Bypass switch 178 is series connected in circuit assembly 124 in a manner such that when said last switch is closed, operation of motor 94 will not require that switch 152 be closed against terminal 158. This bypass feature is necessary in the illustrated embodiment because when inductance coil 174 causes switch 144 to open, the circuit of coil 134 will be broken. As a result switches 138, 140 and 142 will be restored to their normal open condition, in consequence of which coil 148 will become deenergized and switch 152 will return to its position against terminal 154.

By reason of the foregoing construction, motor 94 is adapted for continuous operation, once it is started, until: (1) the power is turned off by opening switch 110; (2) housing 16 is lifted to permit restoration of switch 164 to its normal condition, or (3) a normally closed switch 182, which is connected in series between one side of motor 94 and circuit assembly 124 and manually controllable by handle 184 (FIG. 1), is open. In the latter event, a normally closed switching element 186 in circuit wire 172, and which is mechanically coupled to switch 182, opens circuit wire 172. Thereupon, coil 174 will become deenergized and cause switch 178 to open and interrupt power to motor 94. In the second event switch 164 will be restored to its normal condition in which plate 168 will be moved to open circuit wire 172. As a result thereof, coil 174 will become deenergized with accompanying aforestated consequences. In the first event, of course, interruption of power will similarly cause deenergization of coil 174 with a consequent opening of a thereby held switch 178.

The rocking motion imparted to holder 36 by reciprocative arm 82 will enable the contents of tubes 38 and 40 to be carefully studied and compared. Moreover the apparatus enables effortless provision of uniform conditions not only for viewing and comparing successive tests but also for performing particle generating reactions. These features are especially important in evaluating particles such as agglutinations formed in an immunological reaction in vitro for diagnosis of a disease state.

By means which will readily suggest themselves, a controlled volume of a second reagent such as agglutinin, may be added automatically and over a predetermined period in receptacle 38 to a first reagent such as a serum containing agglutinogen in response to an effect which may be associated with the commencement of agitation of receptacle 38 by arm 96. Moreover, there is also contemplated and comprehended by the present invention the employment of a variable time delay relay means in place of the fixed time delay relay 150. Thereby, various tests having different standard agitating periods can be performed with one apparatus. This, of course, will require circuit changes from the illustrated embodiment, the character of which will be evident to those skilled in the art.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrated and not in a limiting sense.

What is claimed is:

1. Viewing apparatus comprising: a holder for an open ended light passing receptacle containing a liquid and therewith mixed particles; means for illuminating liquid contents of a receptacle in said holder; means for supporting said holder in a first position; means for oscillating said holder at a predetermined rate while supported in said first position correspondingly to stir particles in a liquid in a receptacle in said holder, and means supported in light transmission alignment with said holder for indirectly viewing the condition of receptacle contents while illuminated during stirring in said holder.

2. Apparatus according to claim 1 further characterized by means for moving said holder from said first position to, and releasably retaining said holder in, a second position in which the opening of a receptacle in said holder is disposed essentially upwardly for reception of a reagent; means for releasing said holder in response to passage of time, and means effective upon holder release for spontaneously restoring said holder from said second to said first position.

3. Apparatus according to claim 2 in which the holder is rockably mounted, said oscillating means comprising a vertically reciprocative member for rocking said holder while in said first position.

4. Apparatus according to claim 3 in which said reciprocative member bearingly supports from below said holder while in said first position, said member proportioned for holding a receptacle with its open end disposed to one side and at an angle adequate to prevent liquid spillage from such open end while held in said holder in said first position.

5. Apparatus according to claim 3 having means for vigorously agitating the contents of a receptacle in said holder while in said second position.

6. Apparatus according to claim 5 further characterized by means defining a housing for said illuminating means and disposed about said holder, said housing having a window opening, said holder being slotted for light passage, said means for viewing contents comprising a mirror arranged to reflect through said window light transmitted through a receptacle in said holder.

7. Apparatus according to claim 6 in which said holder has a first well for removably receiving a first receptacle and a first pair of slots extending from said well, said slots defining a first light path through said holder, one of said slots aligned with said illuminating means and the other of said slots aligned with said mirror.

8. Apparatus according to claim 7 in which said holder has a second well for removably receiving a second receptacle and disposed adjacent said first well, said holder having a second pair of slots extending from said second well and defining a second light path through holder, one of said second slots aligned with said illuminating means and the other of said second slots aligned with said mirror whereby a test reaction in one receptacle can be compared visually with a standard reaction in another receptacle.

9. Apparatus according to claim 5 in which said holder has biasing means for spontaneous restoration to said first position from said second position.

10. Apparatus according to claim 9 in which said holder has a base opening, said agitating means comprising a vibrative arm disposed in said base opening and proportioned for engaging a receptacle in said holder.

11. Apparatus according to claim 9 having means for terminating agitation including an electrical circuit having a first solenoid arranged for effecting operation of said agitating means, a second solenoid comprising said releasing means and timing means for effecting operation of said releasing means and simultaneously preventing operation of said agitating means.

12. Viewing apparatus comprising:
a holder having an open mouth for supporting an open ended transparent tube and the like in a manner such that the contents thereof are visible;
means for releasably securing the holder in one position in which the open mouth is directed upwardly;
means for biasing said holder to another position in which the open mouth is directed other than upwardly;
means for vigorously agitating a tube while in said one position; and
means for gently rocking said holder between said other position and a medial position angular to said one and other positions for sloshing liquid from side to side and displaying liquid contents of a tube in said holder.

13. Apparatus according to claim 12 characterized by a base; said holder arranged for pivoting relative to said base, the means for rocking said holder comprising a vertically reciprocative arm for catching said holder when released from securance.

14. Apparatus according to claim 13 further characterized by a housing in which said holder is secured, said housing having an opening for passage of the open end portion of a tube held in said holder.

15. Apparatus according to claim 14 further characterized by partitioning means defining a first chamber and a second chamber in said housing, and a light source in one of said chambers, said holder disposed adjacent the partitioning means in the other of said chambers, and aligned openings in said partitioning means and said holder for confining light from said source to a path through said holder for viewing contents of a therein held tube.

References Cited

UNITED STATES PATENTS

| | | | |
|---|---|---|---|
| 1,204,664 | 11/1916 | Jackson | 356—197 |
| 1,353,500 | 9/1920 | Spindler | 23—253X |
| 1,368,687 | 2/1921 | Bennetts | 23—259UX |
| 1,926,466 | 9/1933 | Twohy | 356—197 |
| 2,417,802 | 3/1947 | Longstreet | 23—230Bio. |
| 2,560,107 | 7/1951 | Hewson | 23—259UX |
| 2,768,879 | 10/1956 | Hewson | 23—253 |
| 2,809,020 | 10/1957 | Magee et al. | 73—53UX |
| 2,899,858 | 8/1959 | Stott | 23—253UX |
| 3,302,452 | 2/1967 | Leslie | 23—259X |

MORRIS O. WOLK, Primary Examiner

B. S. RICHMAN, Assistant Examiner

U.S. Cl. X.R.

23—230, 259; 73—53; 259—54, 72; 356—197, 246